(12) United States Patent
Till

(10) Patent No.: US 6,435,690 B1
(45) Date of Patent: Aug. 20, 2002

(54) PERIMETER LIGHT ILLUMINATION SYSTEMS FOR PORTABLE COMMUNICATION DEVICES AND ASSOCIATED METHODS

(75) Inventor: David Till, Cary, NC (US)

(73) Assignee: Telefonaktiebolaget L.M. Ericsson, Stockholm (SE)

( * ) Notice: Subject to any disclaimer, the term of this patent is extended or adjusted under 35 U.S.C. 154(b) by 12 days.

(21) Appl. No.: 09/666,936

(22) Filed: Sep. 21, 2000

(51) Int. Cl.[7] .................................................. H04M 1/12
(52) U.S. Cl. .............................. 362/88; 362/577; 362/85
(58) Field of Search ............................... 362/88, 24, 28, 362/330, 336, 337, 327, 339, 23, 109, 190, 191, 577, 85; 455/566; 379/433.04

(56) References Cited

U.S. PATENT DOCUMENTS

| | | | |
|---|---|---|---|
| 4,953,205 A | | 8/1990 | Yang ........................... 379/376 |
| 5,087,906 A | * | 2/1992 | Eaton et al. ............. 340/311.1 |
| 5,237,607 A | | 8/1993 | Diamantis ................... 379/419 |
| 6,030,088 A | * | 2/2000 | Scheinberg ................... 362/85 |

FOREIGN PATENT DOCUMENTS

EP   1109380 A   6/2001

OTHER PUBLICATIONS

"900 series: Users' guide" Motorola, XP0021610139, http://www.mot.com/GSS/CSG/Europe/English/Products/Pocket/cd900 en.pdf > (May, 6, 1998.)
International Search Report, International Application No. PCT/US 01/28981, mailed Apr. 3, 2002.

* cited by examiner

Primary Examiner—Sandra O'Shea
Assistant Examiner—Bao Truong
(74) Attorney, Agent, or Firm—Myers Bigel Sibley & Sajovec, P.A.

(57) ABSTRACT

Perimeter lighting systems for portable communication devices such as radiotelephones include a light distribution channel which is configured to capture light emitted by a device and directs it around perimeter portions of the device to allow for easier locating means in dark or low light conditions. The perimeter lighting system can be integrated into the housing of the device or can be provided as an after market case or belt clip.

42 Claims, 14 Drawing Sheets

PERIMETER LIGHT ILLUMINATION SYSTEMS FOR PORTABLE COMMUNICATION DEVICES AND ASSOCIATED METHODS

FIELD OF THE INVENTION

The present invention relates to illumination of portable communication devices.

BACKGROUND OF THE INVENTION

Portable communication devices such as portable cellular or radiotelephones are becoming smaller and are used both during the day and at night. In addition, during periods of non-active use, users may leave the portable communication device in dark locations such as purses, briefcases, dark recessed areas or corners of cars and houses, as well as the outdoors in low light areas. Many portable cellular telephones have an LED (light emitting diode) which flashes (generally with a "green" color) when the telephone is in a standby mode. This LED is typically viewable through a small opening at a top corner of the telephone and may help the user to locate their cellular telephone in a dark room or under limited lighting conditions if the LED on the telephone is in a substantially unobstructed viewing position relative to the user. However, the flashing LED may not be a reliable locating means in the dark, as it can be relatively easily obstructed from the view of the user depending on the positioning of the telephone relative to the user or, because of its limited size and localized position on the telephone, the flashing light may itself be covered.

SUMMARY OF THE INVENTION

In view of the foregoing, the present invention provides perimeter lighting systems for portable communication devices. More particularly, a first aspect of the present invention is a portable communication device with distributed perimeter locating lights. The portable communication device having a first major surface with a keypad and a display thereon and an opposing second major surface. The first and second major surfaces are maintained in spaced apart relationship by first and second sidewalls and first and second endwalls. The portable communication device has an operative active mode and a standby mode. The device also includes a plurality of spaced apart light emitters positioned along selected perimeter portions of the portable communication device such that the light emitters are spaced away from the display and keypad, and at least one light source operably associated with the plurality of light emitters. The device also includes a power source operably associated with the light source. The light emitters are configured to emit externally viewable light when the portable communication device is in the standby mode.

The plurality of light emitters can be discrete points positioned about one, and preferably, two or more of the perimeter portions of the top, bottom, front and rear surfaces of the device and/or about two spaced apart surfaces oriented at about 90 degrees relative to the other to provide lighting which is viewable if one side is in an obstructed viewing position.

In one embodiment, the plurality of spaced apart light emitters are carried or positioned on a light guide case/holder which is configured and sized to receive at least a portion of the portable communication device therein. The case includes at least one light distribution channel therein and at least one light inlet channel operably associated therewith. The device further comprises a light source which is operably configured to emit light to an external position on the device when the device is in the standby mode. The case is configured to snugly abut the light source at an exit point in the underlying device and direct the emitted light therefrom into the light inlet channel and through the light distribution channel.

In another embodiment, the perimeter lighting can be integrated into the housing of the device itself.

Another aspect of the present invention is an illumination case for a portable telephone. The illumination case includes a body, which is configured to overlie and receive at least a perimeter portion of a portable telephone therein. The body includes a light distribution channel formed therein. The light distribution channel is defined by reflective material applied to the external surface of a light transmissive substrate material. The light distribution channel further includes a series of discrete openings formed in the reflective material and spaced along the length of the light distribution channel to allow light traveling in the light distribution channel to exit therefrom and also includes a light inlet channel in optical communication with the light distribution channel which is configured to operatively engage with a light source.

In one embodiment, the light source inlet channel is configured to snugly surround a port on the portable telephone, which emits light generated by the portable telephone so as to be able to direct the emitted light captured by the inlet into the light distribution channel. This configuration takes advantage of an existing light source on the device itself without requiring additional battery power.

Yet another aspect of the present invention is a method for distributing light along perimeter portions of a portable communication device. The method includes the steps of (a) generating light from a light source operably associated with the portable communication device; (b) distributing the light along selected perimeter portions of the portable communication device; and (c) emitting light from a plurality of locations along selected perimeter portions of the portable communication device so that the emitted light is visually viewable therealong.

In one embodiment, the generating step comprises generating light from an internally disposed light source, then emitting the light from an aperture formed on an external wall of the portable communication device.

Another aspect of the present invention is a portable telephone comprising multiple exterior surfaces. The portable telephone is configured such that, at least during standby, light is emitted from at least two of the multiple surfaces.

In a preferred embodiment, the portable telephone is configured to emit light at multiple discreet points on at least three surfaces, two of the surfaces being orthogonal to each other.

In yet another aspect, the present invention is an illumination case sized and configured to receive at least a portion of a portable communications device therein. The illumination case includes at least one light distribution channel which directs light from a light source to a plurality of externally viewable light emission points arranged to emit light at positions corresponding to perimeter portions of the device.

The present invention can facilitate improved visual location of portable devices without requiring additional large power requirements from the device itself (thereby preserving the operating life of the device between charges). The perimeter lighting systems of the present invention can allow a user to more easily locate small devices in dark or low light conditions. The perimeter lighting system can be embedded in an "after-market" case or can be integrated into the housing of the device itself. For the after market case, configuring the case from an elastomeric material which can emit light about discrete points corresponding to perimeter portions of the device when assembled thereto can also provide improved grip surfaces and/or impact resistance.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF PREFERRED EMBODIMENTS OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In the figures, certain regions, layers, elements or components may be exaggerated for clarity.

Figure 1:
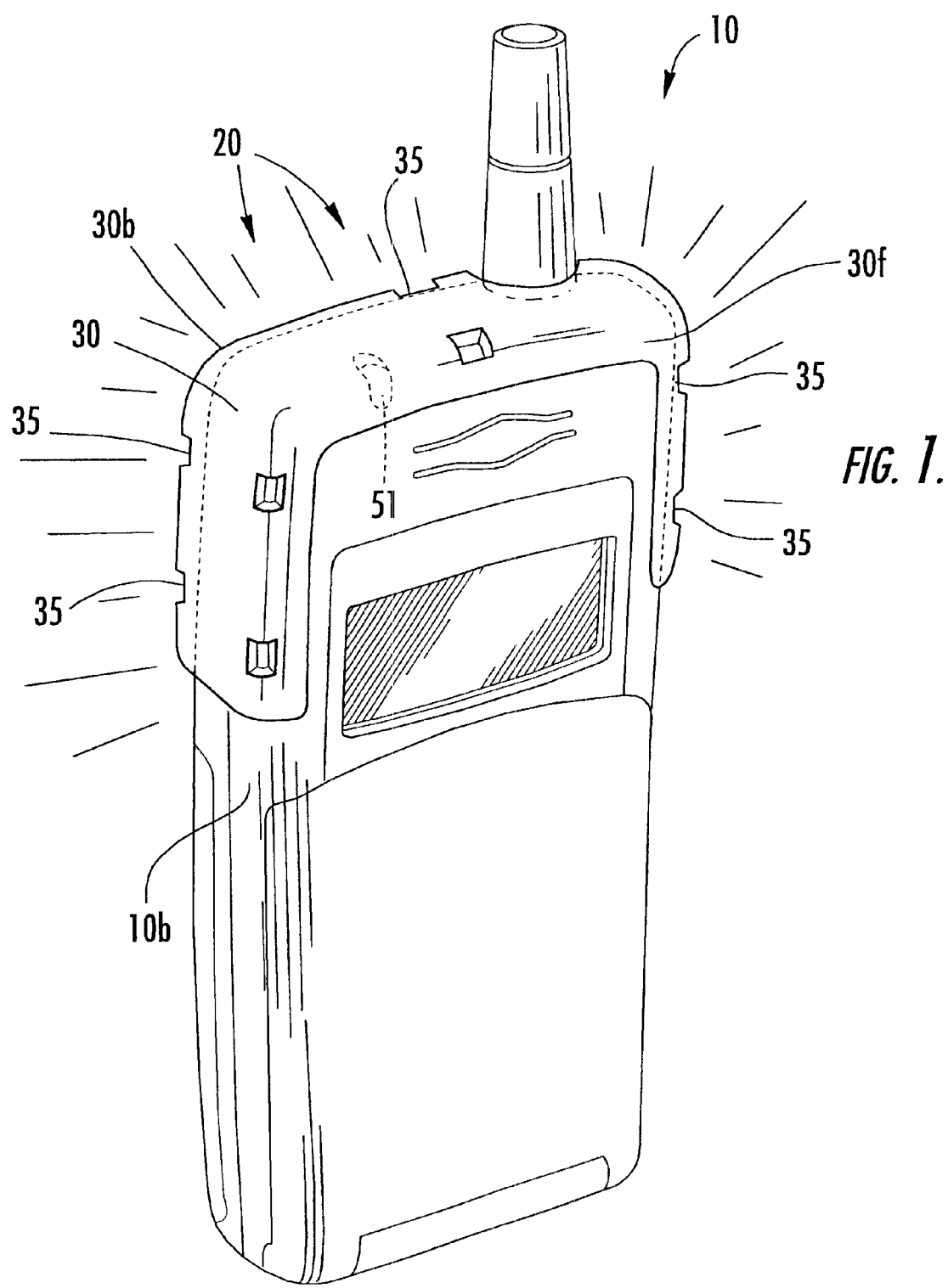
FIG. 1 is a front perspective view of a wireless telephone and casing configured to distribute light and provide illumination about perimeter edge portions of the device according to one embodiment of the present invention.

Turning now to FIG. 1, an embodiment of a wireless device 10 with perimeter lighting 20 is illustrated. As shown, the wireless device 10 is preferably a wireless telephone, and is more preferably a "pocket" cellular or radiotelephone. Of course, the device 10 can be any number of other portable devices such as pervasive computing devices, pagers, portable communication devices, and portable computing devices such as, but not limited to, laptop computers.

As shown in FIG. 1, the perimeter lighting 20 is provided by a light distribution or illumination case 30 which is disposed over a portion of the external body 10b of the underlying device 10. The case 30 includes a plurality of discrete apertures 35 positioned so as to provide or emit light during operation along perimeter or edge portions of the underlying device 10. As shown in FIG. 1, the apertures 35 are positioned to emit light at or adjacent both front and back perimeter portions 30f, 30b, of the device 10. FIG. 1 also illustrates the case 30 positioned on the upper portion of the device 10, but, of course, two cases (not shown) can be used, one for each the top and bottom, or the case 30 be configured to cover more or less of the body of the device 10, some embodiments of which will be discussed further below. Configuring the case (or the housing of the device itself) to distribute light so as to emit from a plurality of locations along at least one of (and preferably two or more of) the perimeter portions of the front and back surfaces, the top, bottom, and/or sides can help facilitate location in a low light area irrespective of the orientation of the device relative to the user. In addition, configuring the case to emit light from at least two of the surfaces which extend about 90 degrees from each other (such as the top and a side), and preferably at three such surfaces (such as the top and two sides) can also facilitate viewing access in low light conditions.

The case 30 can be configured to releasably attach to the underlying body 10b to allow a user to apply or detach the illumination case 30 at will. In a preferred embodiment, the case 30 frictionally engages with the underlying device with an interference fit to hold it against the underlying body of the device 10. In one preferred embodiment, the case 30 comprises an elastomeric material, which is selected to rest against the profile of the underlying body and resist movement against the underlying contact surface. Indeed, elastomeric materials may be selected such that they also provide improved external gripping surfaces (such as, but not limited to, by configuring the case to present a material which conforms responsive to a user's compressive force or a ridged case body) and/or shock absorption to the device 10 which may be inadvertently bumped or dropped.

Alternatively, the illumination case 30 can be configured and attached in other via other attachment means as will be well known to those of skill in the art, such as, but not limited to, adhesives (preferably releasable adhesives), velcro, snaps, hook and loop materials, cantilever latches, and belt-like tightening means such as buckles to hold and pull the case against the body, and the like.

Figure 2:
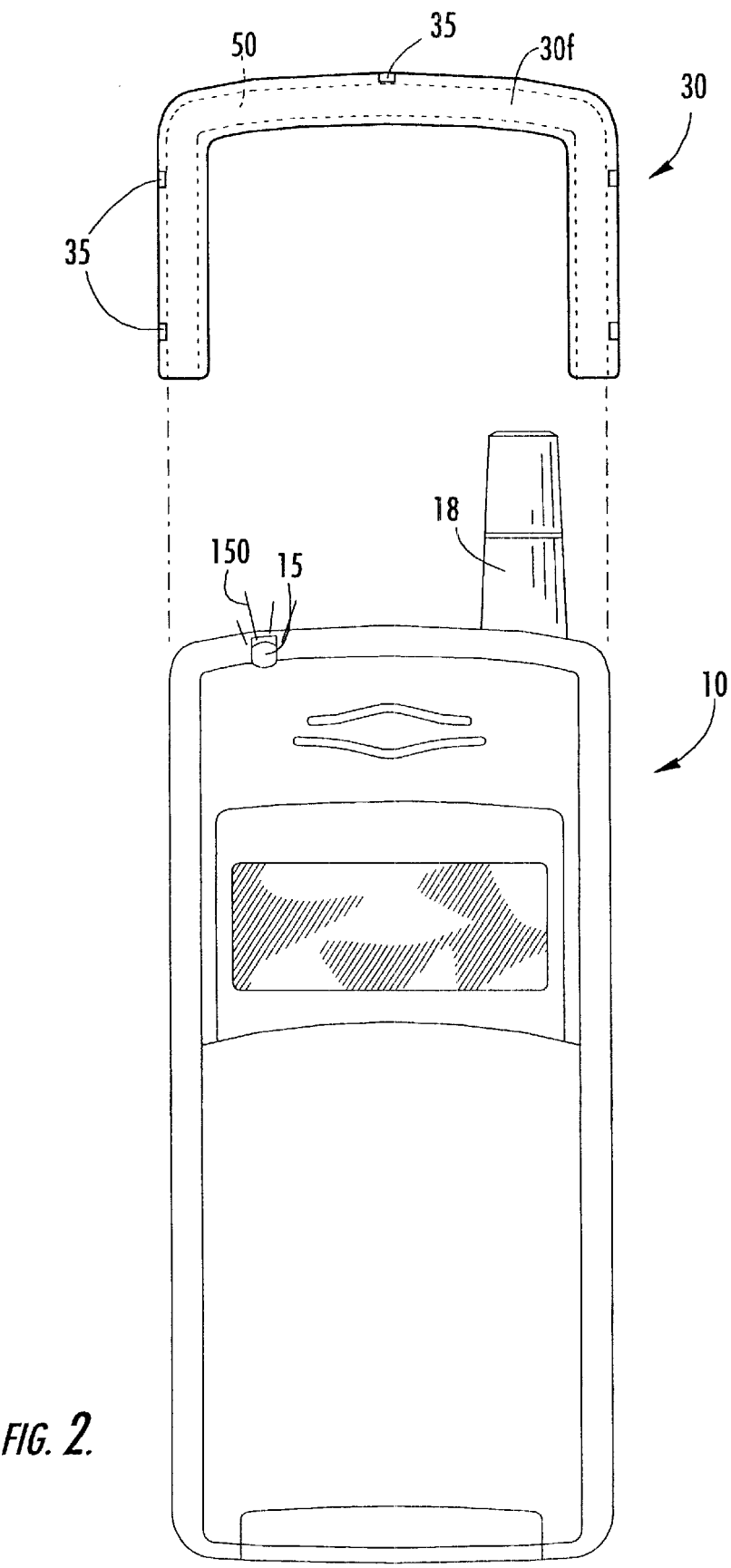
FIG. 2 is an exploded front view of the telephone and casing shown in FIG. 1.
Figure 3A:
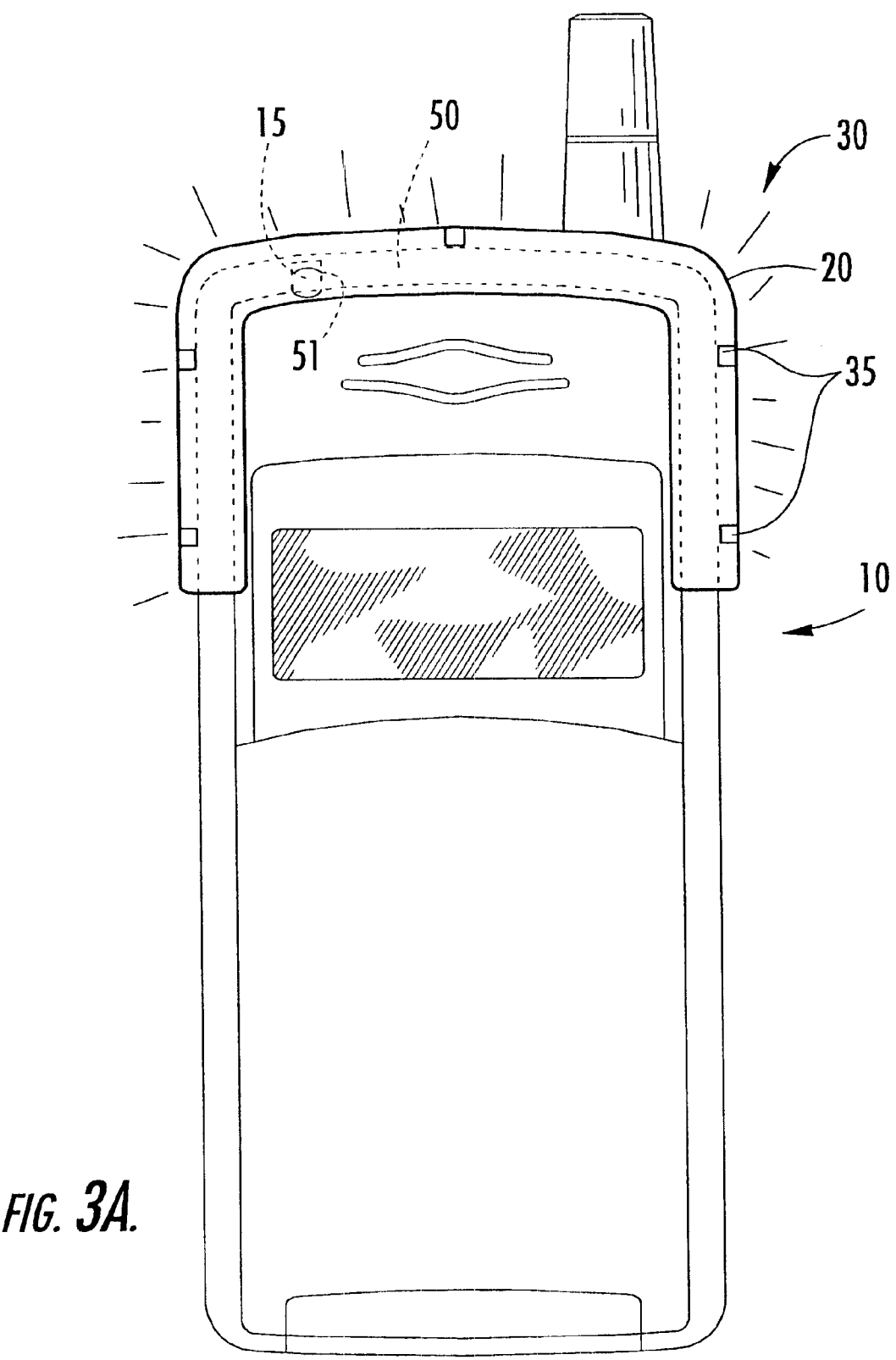
FIG. 3A is a front view of the device shown in FIG. 1.
Figure 4:
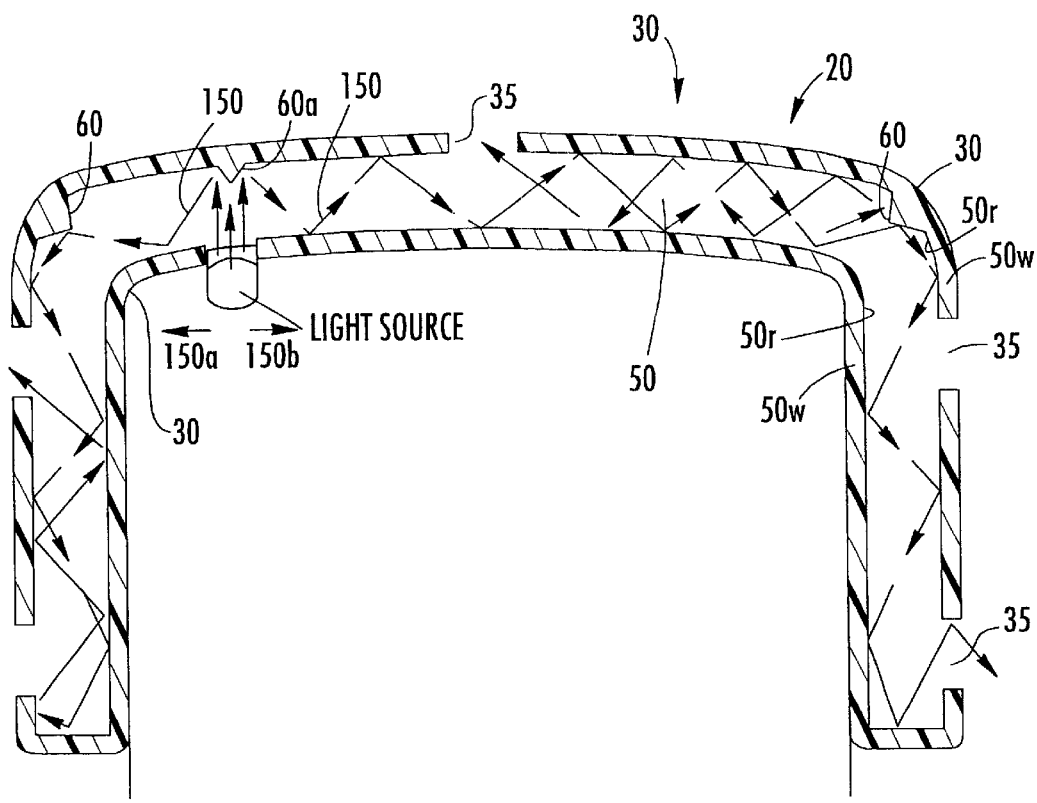
FIG. 4 is an enlarged section view of the casing in FIG. 1 schematically illustrating a light distribution channel according to the present invention.

FIG. 2 illustrates that the case 30 can be configured as an "after-market" accessory sized and configured to mount to a desired device 10. The case 30 includes at least one light distribution channel 50 and a light inlet channel 51 (such as shown in FIGS. 3A and 4) which is configured to engage with a light source. For the after market or accessory embodiments, the case 30 is preferably configured to sealably engage with (i.e., surround and enclose) an operational light indicator (typically green) which is emitted from the body of the device so that the user can verify that the device is in an operational or standby mode. Typically, this light is provided by an LED mounted in the device, the light from which is optically routed to an external surface to thereby emit light at an external location (viewable by a user) on the body of the device. As shown in FIG. 2, the light 150 is generated from an LED held inside the telephone. The light source 15 is preferably a low level LED to reduce battery discharge during extended periods (i.e., when in standby or operative and not hooked to an external power source). The operational light indicator may flash during operation, and in operation, the light emitted by the perimeter lighting system 20 from the apertures 35 may be configured to flash in response thereto.

Thus, in this embodiment, the light 150 is configured to exit the telephone at a top front portion 15 of the device 10. As shown in FIG. 3A, in position, the case 30 is configured to overlie and operably engage with the emitted light 150 by covering and capturing the externally emitted light 150 from the underlying device 10 and re-directing the captured light 150 into the light distribution channel 50.

Figure 3B:
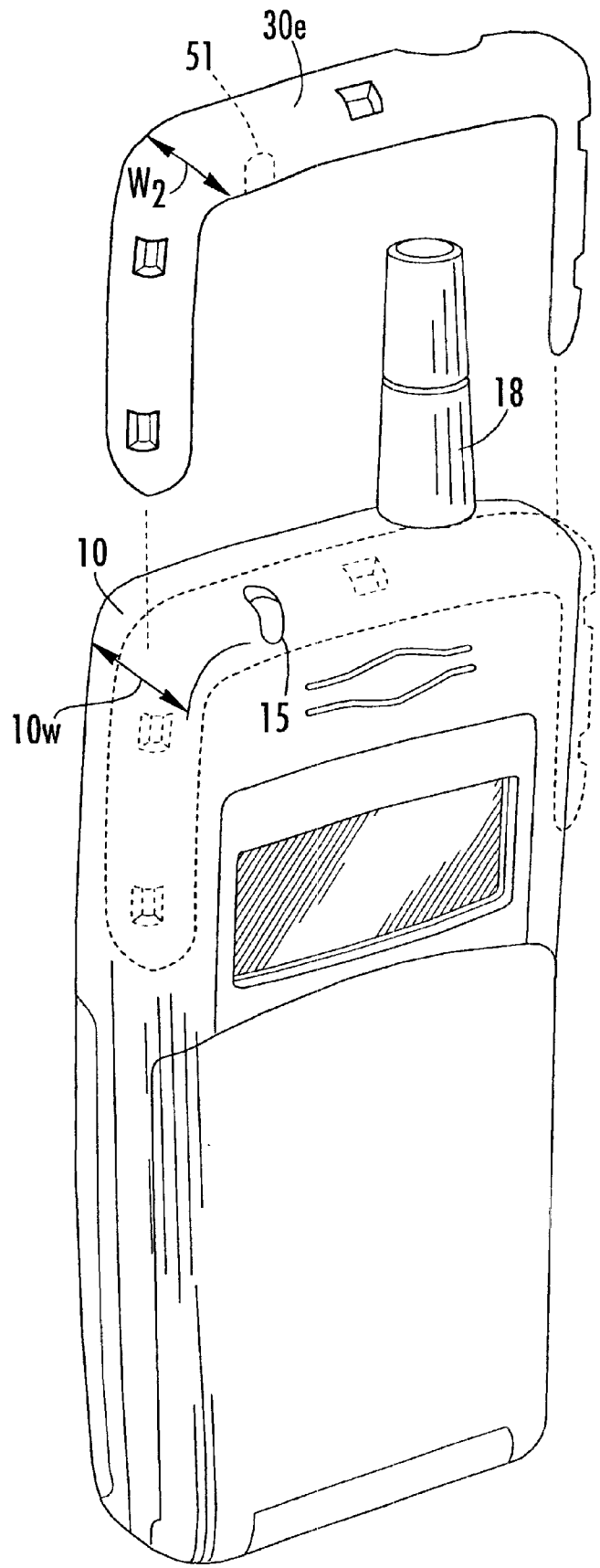
FIG. 3B is a front perspective exploded view of an alternate casing embodiment according to the present invention.

FIG. 3B illustrates a case 30e which is configured and sized to reside on the front top portion of the underlying device and does not span the entire width of the device. Preferably, the case 30e tapers in thickness from front to back. It is also preferred that, for this embodiment, the case 30e be sized and configured such that, in position, it terminates before the back edge of the side. Stated differently, it is preferred that the case have a back to front width (shown as "w$_2$") which is less than about 80% of the corresponding side width 10w of the underlying device.

It should be noted that for cases (such as the illustrated case 30) which are configured to span the top portion of a portable telephone, an antenna cutout 18o (FIG. 13) can be provided to allow a top mounted antenna 18 to extend through or out of the case 30. Similarly, for devices such as telephones with side or rear-mounted antennas (not shown), the cases 30, 30a, 30b, 30c, 30d, 30e, 30f, 30g, (FIGS. 1, 3B, 6, 7, 8, and 13) can also be contoured to fit these configurations according to the instant invention.

FIG. 4 illustrates the perimeter lighting 20 emitted by the case 30 is provided via a single entry channel 51, which directs light 150 captured from the light source 15 along the light inlet channel 51 and into the light distribution channel 50. The light 150 subsequently travels along the light distribution channel 50 of the case 30 to ultimately be emitted at discrete points along the channel 50. It should be noted that although a single light entry 51 and a single channel 50 are illustrated in the figures, multiple entries and/or multiple channels can be used, each in communication with a single or, alternatively, a different light source, according to a particular device or application.

Figure 12:
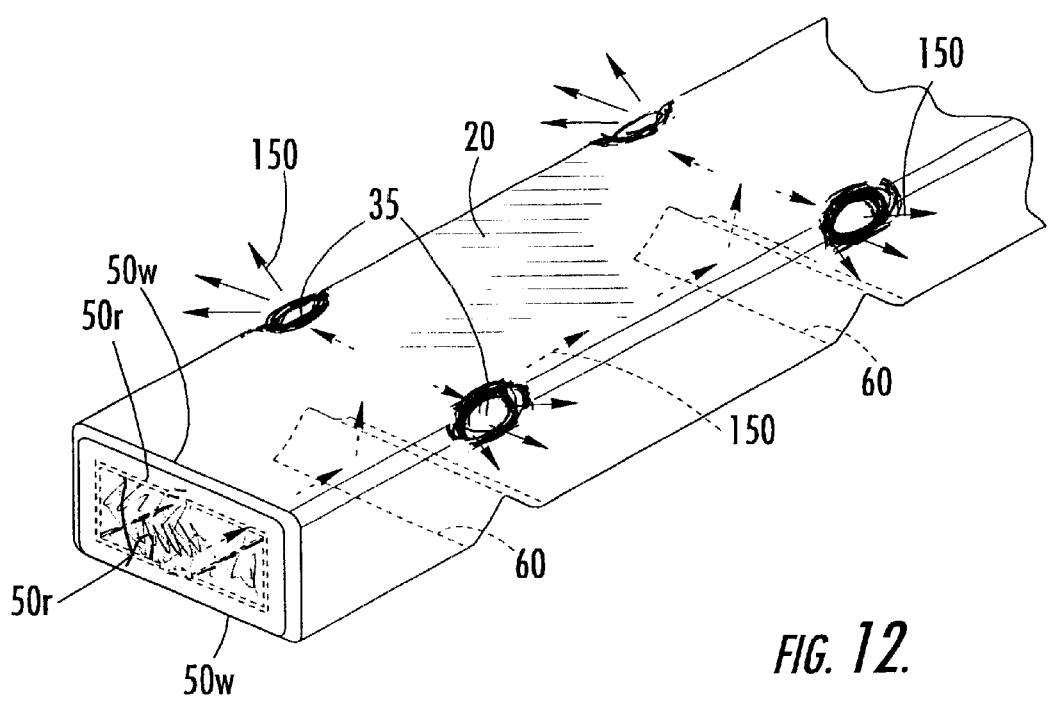
FIG. 12 is a partial section perspective view of a light distribution case according to one embodiment of the present invention.

Referring again to FIG. 4, the light distribution channel 50 includes beam splitters or scatterers 60 disposed along various portions of the light enclosing surfaces of the light distribution channel 50. The beam scatters 60 are configured to interrupt the smooth contour of the inner reflective surface 50r of the light distribution channel 50 to help scatter the reflected light 150 as it travels along the light distribution channel 50. As shown in FIG. 12, one or more light scatterers 60 can also be positioned across from light emitting apertures 35 to help direct light to travel out of various apertures 35 along the length of the channel 50.

As shown, it is preferred that the beam scatterers 60 are configured as inwardly extending protrusions, one of which (designated at 60a) is disposed across the width of the light distribution channel 50 (on the opposite side of the light-transmissive portion of the channel) substantially in line with the center of the light inlet channel 51 to inhibit the reflection of light 150 back into the channel 51. This position can also enable the scatterer 60a to direct the light 150 into two opposing directions 150a, 150b (typically oriented at 90 degrees away from the direction the light travels as it initially enters in the light inlet channel 51) such that it travels further along and downstream of the inlet channel along the length of the channel.

As is also shown, it is also preferred that a beam scatterer 60 be positioned along the inner surface of the outermost wall 50w about the edge portions of the case 30 (corresponding to the curvature of the underlying device 10e). Configuring the light distribution channel 50 with surfaces which scatter light as the light approaches curved portions of the channel (such as at the edges) can help direct the light so that a sufficient portion of the light continues along the channel 50 and, thus, inhibits or reduce the amount of light which may reflect back toward the upstream portion of the light distribution channel 50.

In one embodiment, as shown in FIG. 4, the light distribution channel 50 includes spaced apart outer walls 50w, the inner surfaces 50r of which are reflective such that light reflects off these surfaces and is retained within the light distribution channel 50, emitting and exiting only at the light emitting apertures 35 formed as openings or discontinuations in the reflective surface 50r.

Figure 5:
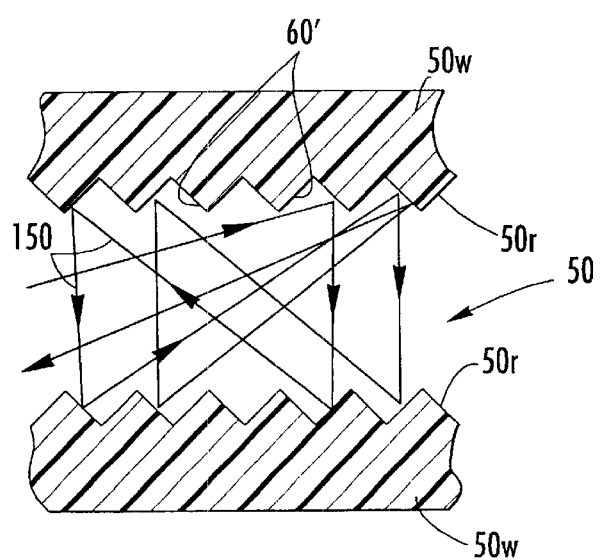
FIG. 5 is a greatly enlarged partial view of a portion of an alternate embodiment of a light distribution channel according to the present invention.

FIG. 5 illustrates that the light reflective surface 50r can additionally or alternatively be configured with ridges or with a rough surface 60' to provide scattering enhancement of the light as it travels along the light distribution channel 50.

Figure 6:
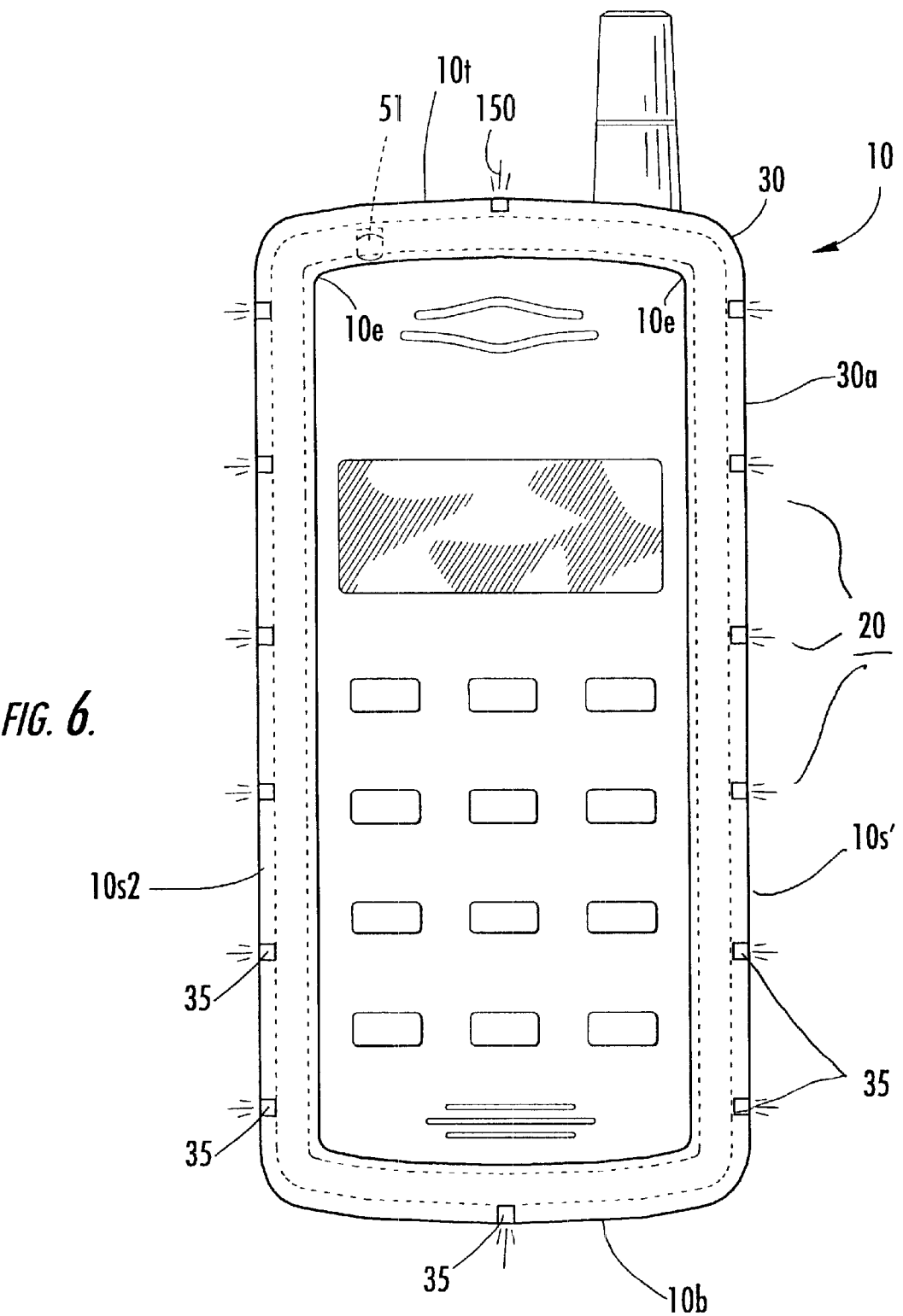
FIG. 6 is a front view of an alternate embodiment of a telephone with a casing according to the present invention.
Figure 8:
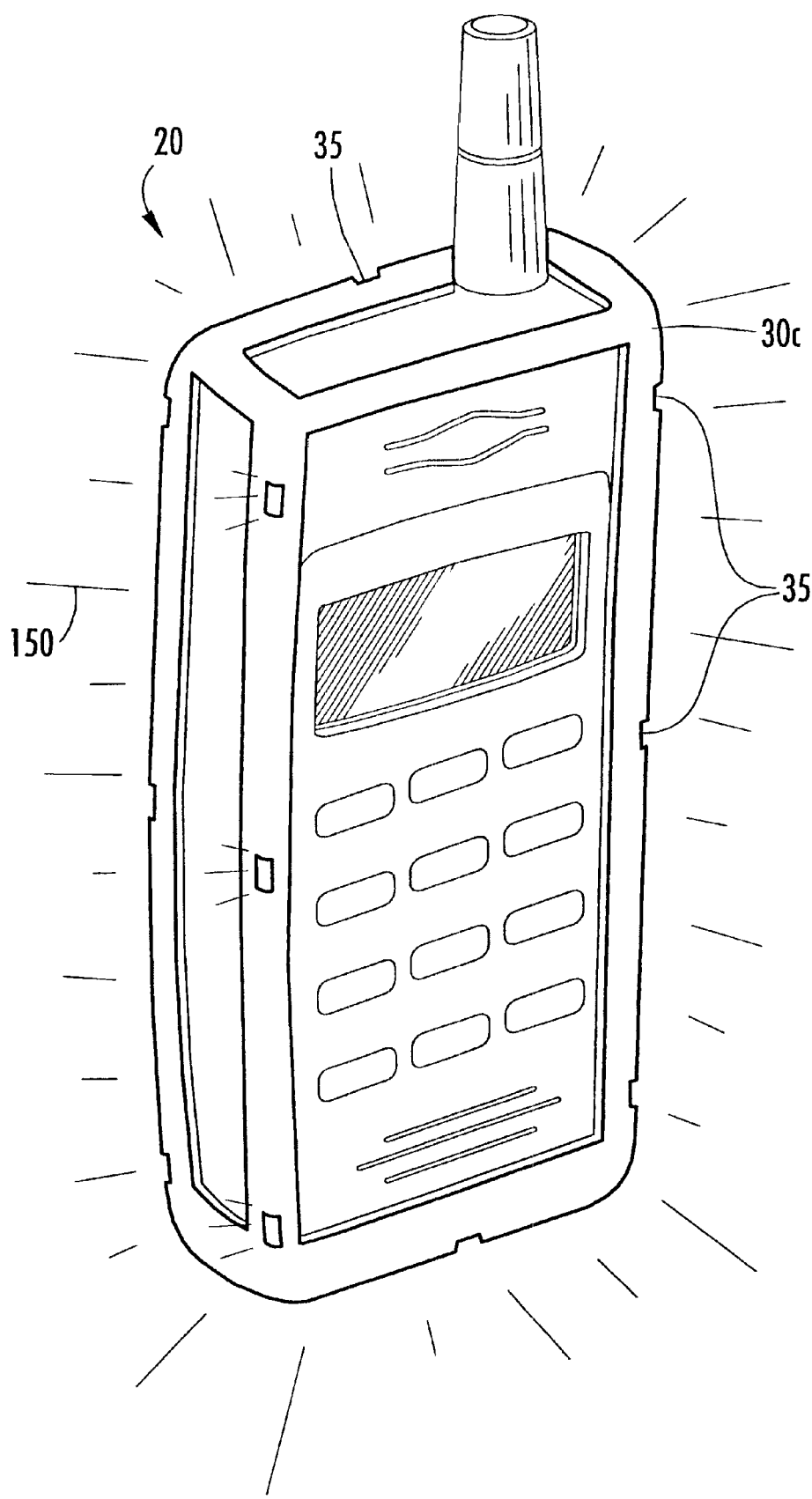
FIG. 8 is a side perspective view of an additional embodiment of a telephone and casing according to the present invention.

FIG. 6 illustrates another embodiment of a device 10 with perimeter lighting 20 according to the present invention. In this embodiment, the perimeter lighting 20 is provided about the perimeter of the front surface (and/or forward side and top and bottom edges) such that, during operation, light 150 can be emitted from the top 10t, bottom 10b, and both sides 10s1, 10s2 of the device. As shown in FIG. 6, the perimeter lighting 20 is provided by a full body case 30a. The case 30a is preferably sized and configured to fit snugly against the underlying device 10 to provide an aesthetic appearance. The case 30a can be formed of an external leather (or leather simulated or vinyl or polymer) package within which the perimeter light distribution system is housed and into which the device 10 can be inserted. Alternatively, the case 30a can be formed from an elastomeric material which is configured to stretch sufficiently to allow an installer or user to position the case 30a over the underlying device 10 and which is also sufficiently elastic to return to a configuration which substantially conforms to the shape of the underlying body. As noted above, elastomeric materials can also function as enhanced gripping surfaces and/or shock absorbing surfaces. FIG. 8 illustrates another embodiment of a perimeter lighting system 20 similar to that shown in FIG. 6, but with a case 30c having a skeletal configuration (covering selected perimeter or edge portions of the underlying body).

Figure 13:
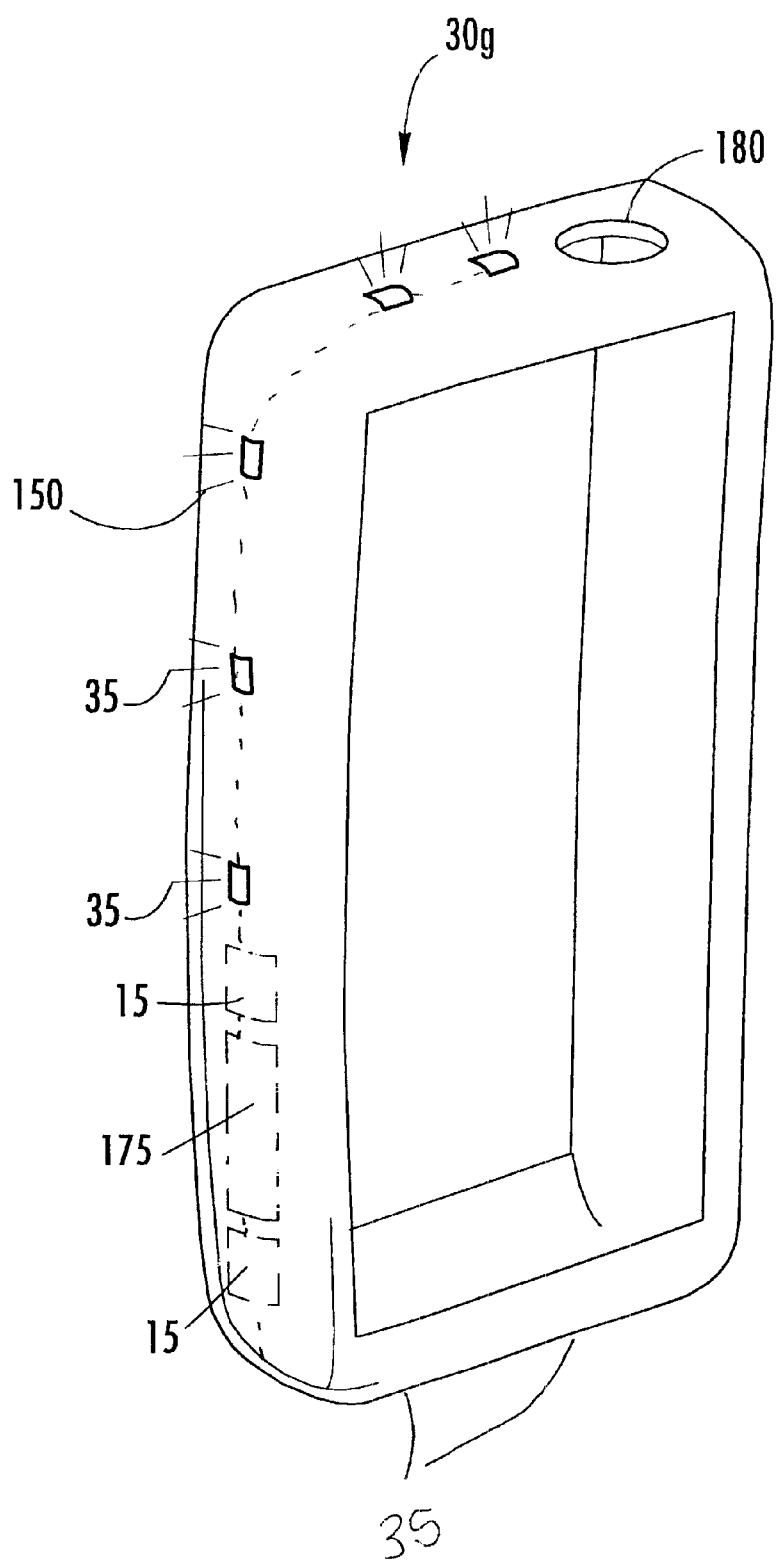
FIG. 13 is a front perspective view of yet another embodiment of a light distribution unit for a device according to the present invention.

As shown in FIG. 13, the case 30g can also include its own integrated light source 15 (shown as a plurality of LED's) which can be used to provide the necessary light during operation. As is also shown, the case 30a can also include an independent power source 175 such as a button battery. The case 30a can also be configured to be detachably engageable with a cable or wire so that the battery 175 can be rechargeable or so that the perimeter lighting system 20 can be powered by an external power source, such as the 12V vehicle-based power outlet or other electric source (not shown).

Figure 7:
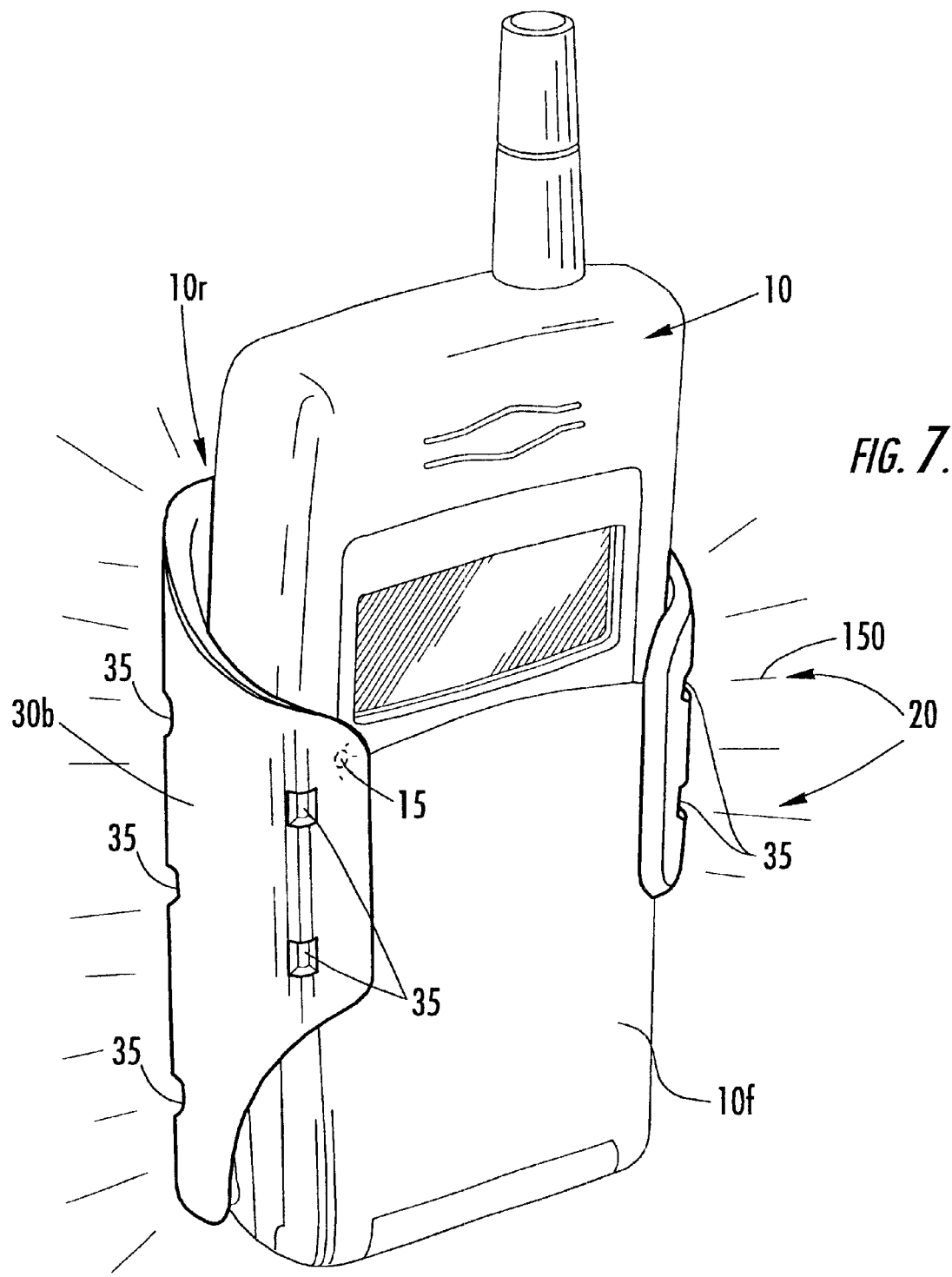
FIG. 7 is a side perspective view of yet another embodiment of telephone and casing according to the present invention.

FIG. 7 illustrates a perimeter lighting system 20 which is integrated into a belt clip case 30b. As shown, light emitting apertures 35 are positioned on the case 30b such that during operation light 150 emits from a plurality of locations about the perimeter of the device, including perimeter portions of the forward and rearward 10f, 10r surfaces of the device 10. This figure also illustrates that the operational light may be disposed on alternative surfaces and that the case 30 (designated as 30a–30e in the other figures) can be configured to capture the light at the desired location. For example, in FIG. 7 for a belt clip embodiment, if the light source 15 were disposed as shown in FIG. 2, the case 30b can include a finger which wraps over a top portion of the device to capture and provide the light inlet channel 51 into the light distribution channel 50 for the perimeter lighting system 20. Of course, the case 30b can be alternatively configured in a number of embodiments such that it is suitable to be worn as a belt-clip while providing perimeter lighting to the device held therein.

Figure 9:
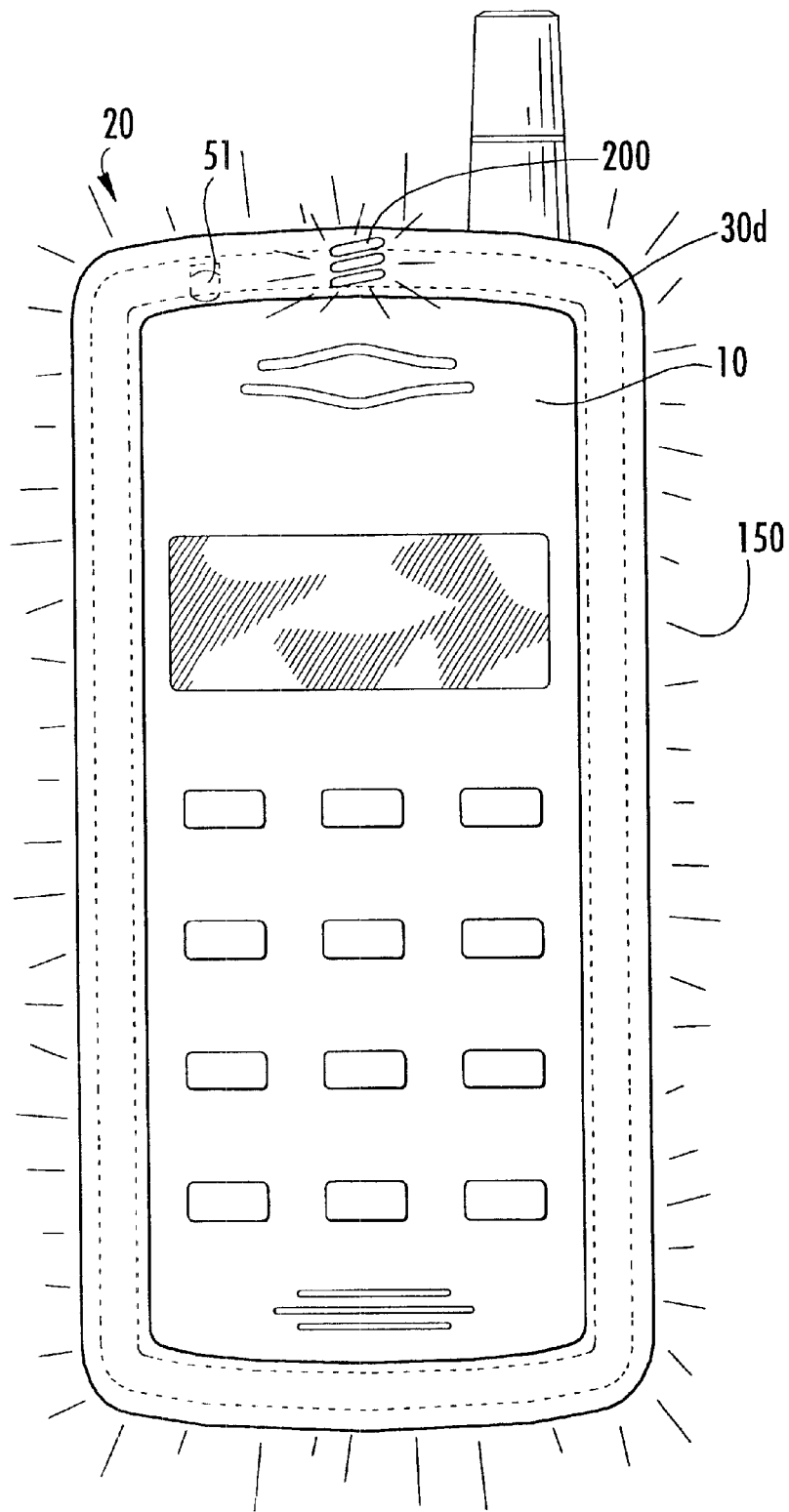
FIG. 9 is a front view of another embodiment of a telephone and casing according to the present invention.

FIG. 9 illustrates that the perimeter lighting system 20 light emitting apertures 35 can be arranged to display an ornamental illumination pattern 200 during operation. The pattern 200 can include one or more of the initials of a user or the initials or logo of the OEM of the device and/or of the service provider, or a school name or employer or other company logo and the like.

Figure 10:
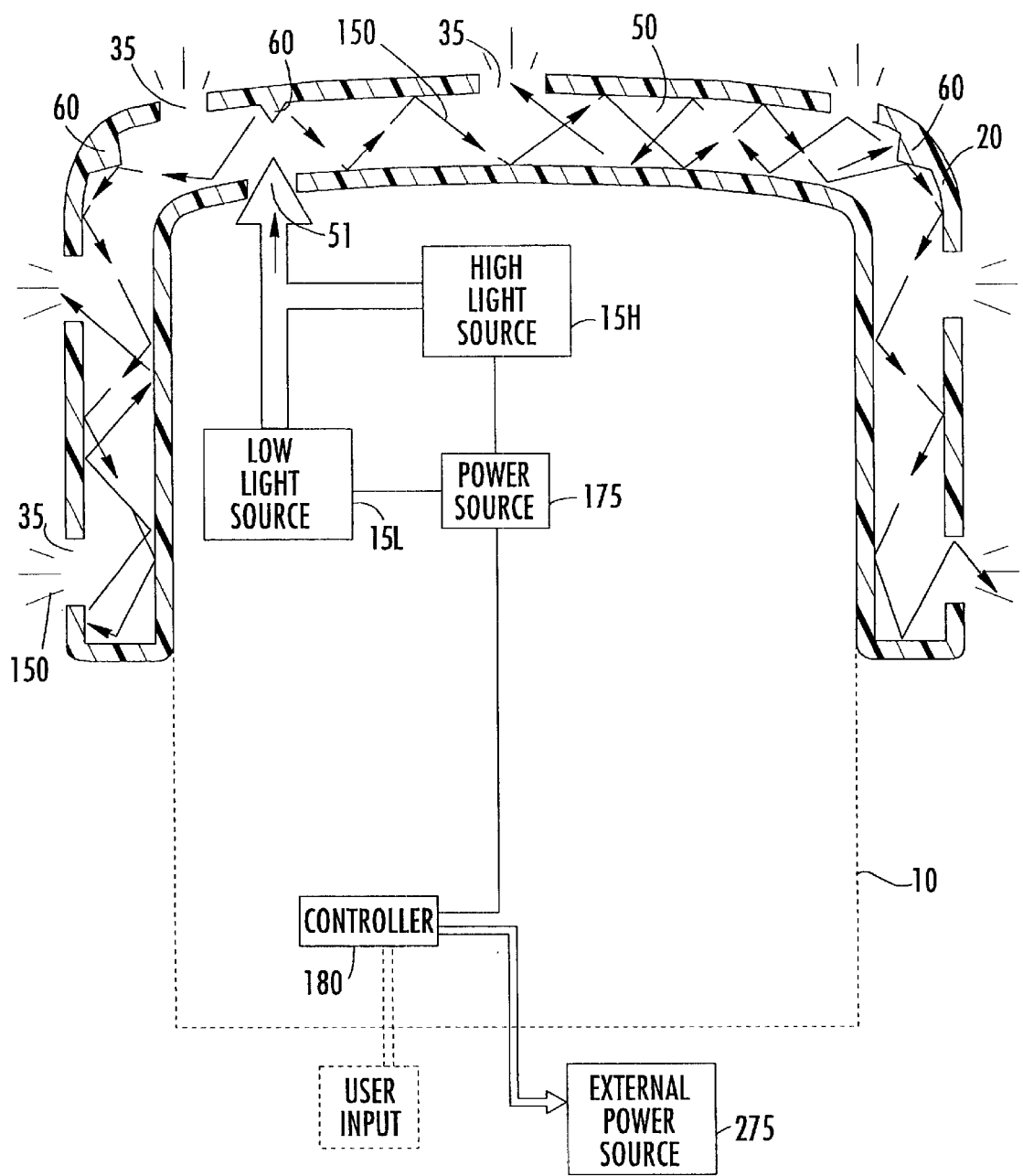
FIG. 10 is a schematic illustration of a light channeling system according to the present invention.

FIG. 10 is a schematic illustration of a perimeter lighting system 20 according to another embodiment of the present invention. The underlying device 10 is shown in dotted line. The device 10 includes a power source 175 (such as a battery) which operably associated with at least one internal light source 15. As shown, the device 10 includes two internal light sources: a low energy light source 15L and a second, preferably increased energy light source 15H. Preferably, each of the light sources are LED's and at least one is configured to provide a brighter light output 15H. Recognizing that operating both light sources 15L, 15H concurrently and/or operating the higher energy light source 15H may undesirably drain the power source 175 of the device 10, it is preferred that the system 20 be configured to operate in a default operating mode from the low light source 15L. The device can also include a controller 180 which is operably associated with the power source 175 and the light sources 15L, 15H to direct the activation of the appropriate light source (or sources). In operation, the light sources 15L, 15H can be separately activated or concurrently activated to direct light into the light distribution channel 50 to provide perimeter lighting about the device 10. The light sources 15 can be configured to provide an intermittent or flashing signal to the light inlet channel 51.

A user input button can be used to activate the perimeter lighting. The button can be a hardware button accessible to the user or a software button operably associated with the controller 180. The software button can also be configured to provide a set-up mode to allow the user to determine whether increased illumination is desired, such as if the user knows in advance that he or she is locating the device in a dark or low light place (for example, at night or in a darkened room or vehicle). The device can also be programmed to allow a user the option to activate both light sources or to select to operate only one of the lower or the higher output light source 15L, 15H. The perimeter light system 20 can also be configured to operate from an external power source 275 when a wire is connected to the device (such as when plugged into a 12V power source in a vehicle). In any event, light is generated from one or more light sources 15 and directed therefrom and into the light distribution channel 50 such that it can exit from light emitting apertures 35 disposed about the perimeter of the device. Fiber optic lines or other conventional light channeling means can be used to direct the light to the light inlet channel(s) associated with the perimeter lighting system 20.

Figure 11:
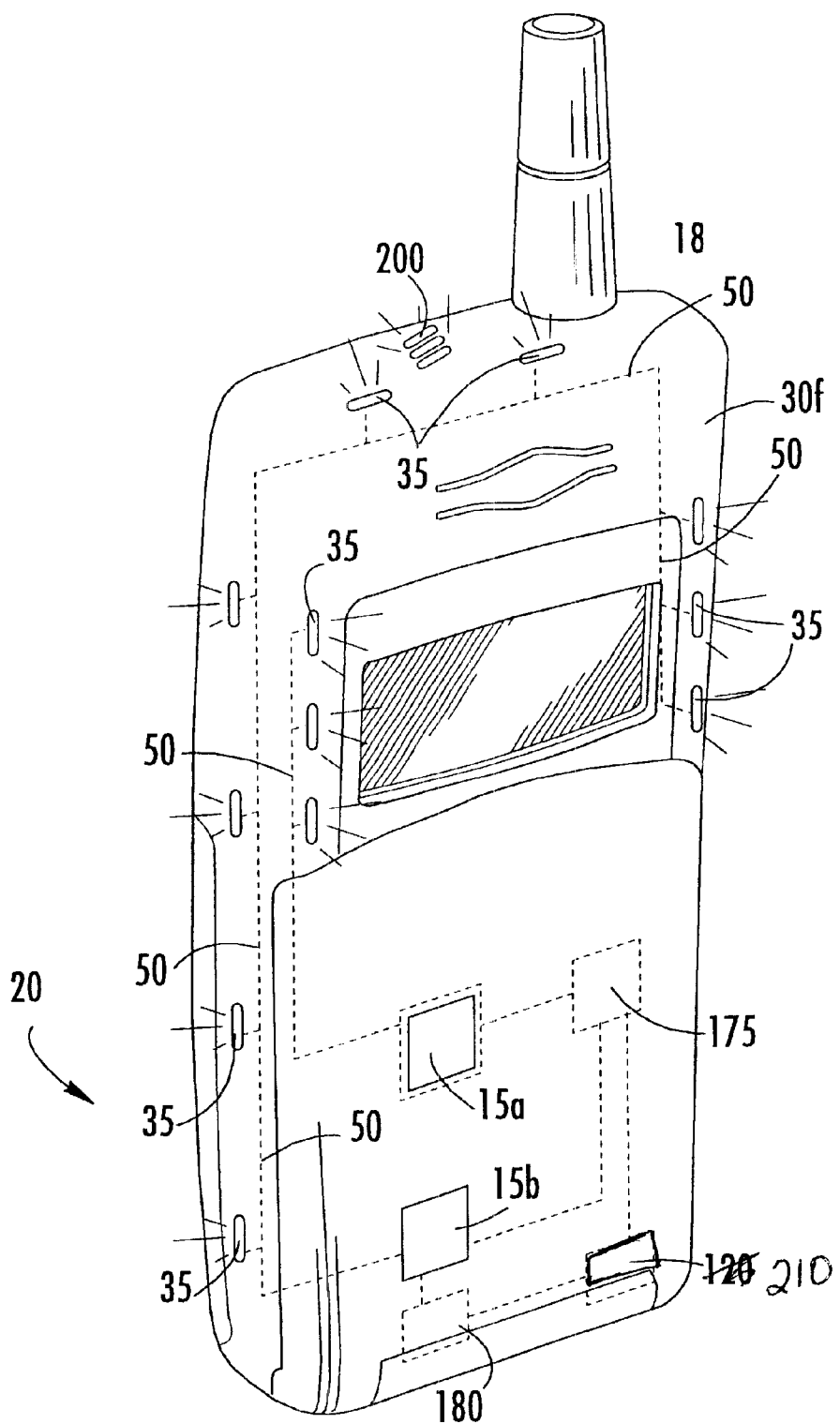
FIG. 11 is a front perspective view of yet another embodiment of a telephone according to the present invention which integrates perimeter lighting from one or more light sources.

FIG. 11 illustrates that the perimeter lighting system 20 can be integrated into a device 30f. Thus, the perimeter light emitting apertures 35 can be formed directly into the housing of the device 30f. The device 30f also includes at least one light source 15 (shown as the two sources, 15a, 15b) and an associated power source 175. Light from multiple light sources can be directed along a shared light distribution channel or separate light distribution channels 50 to provide perimeter light to the desired exterior locations such as the top and bottom and/or side portions of the device 10. As also shown, the device 10 can include a controller 180 to control which light sources 15a, 15b are activated and to allow a user to activate the perimeter lighting via a software or externally accessible hardware activation button. In addition, the device can include a light sensor 210 to automatically activate the perimeter lighting when low light conditions are detected. Of course, if a low light sensor 210 is employed, it is preferred that it be disposed on the device such that it is spaced away from (not proximate to) a light emitting aperture 35.

Figure 14A:
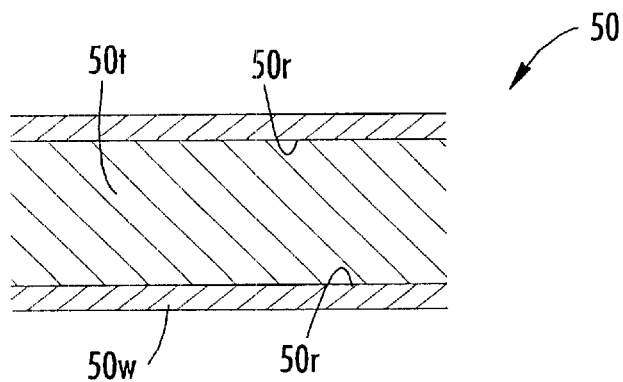
FIGS. 14A–14C are partial side section views of light distribution channels according to the present invention.
Figure 14B:
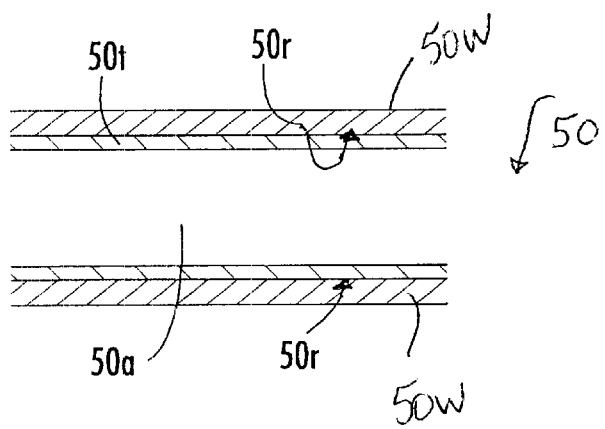
Figure 14C:
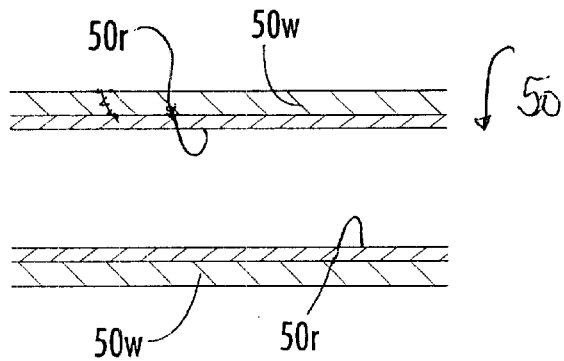

Turning now to FIGS. 14A–14C, preferred embodiments of a light distribution channel 50 are shown. FIG. 14A illustrates that the light distribution channel 50 includes outer walls 50w and a center portion 50t formed of a material which is transmissive to light. The light transmissive layer or material is preferably translucent or substantially transparent. The outer walls 50w each include an inner reflective surface 50r. Preferably, an elastomeric optically transmissive base material such as a polymer is used to form the transmissive portion 50t and a thin layer of a reflective coating is applied over the base material to form the outer walls 50w and, thus, the reflective surfaces 50r. In one embodiment, the transmissive base material is a clear polycarbonate, silicone, or acrylic material which can be molded in a desired or selected configuration. The transmissive base material in this embodiment forms the portion of the light distribution channel 50 through which the light travels. Preferably the base material has a thickness of about 1.5–3 mm. It is also preferred that a thin metallic coating of from about 0.1 mm–0.5 mm be inked, sprayed, molded (as a foil layer inside a mold), or otherwise applied thereto. Suitable coatings include, but are not limited to, silver, gold, and aluminum inks and mylar, aluminum or other metallic foils. The apertures 35 can be formed by piercing bubbles strategically positioned in the skin during molding to open the skin of the molded body through the coating to allow light to exit therefrom. The aperture size is configured such that its open area is proportional to or corresponds to the light source (illumination strength/power, etc . . . ) and number of openings in the surface. Preferably, the light emitting apertures 35 are sized and configured to be relatively small, such as with an area which is less than about 3 $mm^2$. Although shown as rectangular or oval in the figures, it will be appreciated that the shape and contour of the apertures 35 are not limited to such configurations.

FIG. 14B illustrates an alternate embodiment of a distribution channel 50. As shown, a transmissive substrate material 50t is disposed about an air gap 50a and an outer wall 50w having a reflective inner surface 50r is disposed on the substrate opposing the air gap 50a.

FIG. 14C illustrates an additional exemplary embodiment of a light distribution channel 50. In this embodiment, a substrate is used to form the outer walls 50w and a reflective material or coating defines the inner surface across an air gap 50a. In this embodiment, no light transmissive internal material is necessary as the air gap permits the light to distribute therewithin and travel along the channel 50.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A portable communication device with distributed perimeter locating lights, comprising:
    a portable communication device having a first major surface with a keypad and a display thereon and an opposing second major surface, said first and second major surfaces spaced apart by first and second sidewalls and first and second endwalls, wherein said portable communication device has an operative active mode and a standby mode;
    a plurality of spaced apart light emitters positioned along selected perimeter portions of said portable communication device, such that said light emitters are spaced away from said display and keypad;
    at least one light source operably associated with said plurality of light emitters,
    a power source operably associated with said light source, wherein said light emitters are configured to emit externally viewable light when said portable communication device is in the standby mode,
    wherein said device comprises at least one light distribution channel extending along at least a portion of the length and/or width of the perimeter of said device in optical communication with said at least one light source, wherein said light distribution channel is defined by spaced apart reflective surfaces, and wherein, in operation, openings formed in said reflective surface along said light distribution channel define said light emitters such that, in operation, said openings are configured to allow a portion of the light traveling in said light distribution channel to exit therefrom.

2. A portable communication device according to claim 1, wherein said plurality of light emitters are disposed along perimeter portions of said device such that they are externally viewable from both first and second major surfaces of said portable communication device.

3. A portable communication device according to claim 1, wherein said light distribution channel comprises at least one light inlet channel in optically communication therewith, and wherein said light distribution channel with said plurality of spaced apart light emitters are positioned in a case which is configured and sized to receive at least a portion of said portable communication device therein, wherein said device light source is housed internal to the device and is operably configured to emit light to an external position on said device at least when said device is in the standby mode, and wherein said case is configured to snugly abut the external light emitting position of the device light source so that the light inlet channel in said case is aligned with said light emitting position of said device and, in operation, said light inlet channel receives light emitted from said device external location and directs the light emitted therefrom through said light inlet channel and into said light distribution channel.

4. A portable communication device according to claim 3, wherein said case is a belt clip configured to hold said portable communication device therein.

5. A portable communication device according to claim 3, wherein said case is formed of an elastomeric material.

6. A portable communication device according to claim 1, wherein said reflective surface is configured to refract the light as it travels captured in said light distribution channel.

7. A portable communication device according to claim 6, wherein said light distribution channel is configured to promote the scattering of light traveling therein.

8. A portable communication device according to claim 3, wherein said device light source is operably configured to flash when said device is in the standby mode; and wherein said case is configured to capture the flashing light emitted therefrom such that the flashing light is directed into said light distribution channel.

9. A portable communication device according to claim 8, wherein light emitted from said light emitters is configured to flash during operation.

10. A portable communication device according to claim 1, wherein said light emitters are arranged on said portable communication device to present an externally visible ornamental pattern during operation.

11. An illumination case for a portable telephone, comprising:
    a body sized and configured to overlie and receive at least a perimeter portion of a portable telephone therein, wherein said body comprises a light distribution channel formed therein, said light distribution channel being defined by reflective material applied to the external surface of a light transmissive substrate material, said light distribution channel further comprising a series of discrete openings formed in said reflective material and spaced along the length of said light distribution channel to allow light traveling in said light distribution channel to exit therefrom, said body further comprising an inlet in optical communication with said light distribution channel which is configured to operatively engage with a light source.

12. An illumination case according to claim 11, wherein said inlet is configured to snugly surround a port on the portable telephone which emits light generated by the portable telephone so as to be able to direct emitted light captured by said inlet channel into said light distribution channel.

13. An illumination case according to claim 12, wherein, in position on a telephone and in operation, said light inlet channel is configured to capture discrete light generated by the underlying portable telephone, such discrete light being externally visible when said case is removed from the underlying portable telephone.

14. An illumination case according to claim 11, wherein said light transmissive substrate material comprises one of clear polycarbonate and acrylic.

15. An illumination case according to claim 11, wherein said case is configured to cover at least an upper top portion and upper side portions of the portable telephone.

16. An illumination case according to claim 12, wherein said case is configured to be attachable to a belt or pocket.

17. An illumination case according to claim 12, wherein said body is flexible and comprises an elastomeric material.

18. An illumination case according to claim 12, further comprising at least one light beam splitter positioned in the light distribution channel across from said inlet channel to facilitate the scattering of light as it enters said distribution channel.

19. A method for distributing light along perimeter portions of a portable communication device having active and standby operations, comprising the steps of:

generating light from an integrated circuit light source operably associated with the portable communication device;

distributing the generated light along selected perimeter portions of the portable communication device through a plurality of discrete light emitters spatially spaced apart about the selected perimeter portions; and emitting light from a plurality of discrete locations through the light emitters along the selected perimeter portions of the portable communication device so that the emitted light is visually viewable therealong to thereby allow easier visualization of the location of the device during standby mode.

20. A method according to claim 19 wherein said generating step comprises;

generating light from an internally disposed integrated circuit light source comprising an LED light source; and then emitting the light from at least one aperture formed in an external wall of the portable communication device.

21. A method according to claim 20, wherein said method further comprises the step of capturing the LED light emitted from the at least one aperture in the wall of the device in a light distribution channel having a reflective surface with openings formed through the reflective surface so as to allow the light to exit externally therefrom during said distributing step.

22. A method according to claim 20, wherein said distributing step comprises the steps of:

channeling light along a light distribution channel held proximate to perimeter portions of the portable communication device, wherein the light distribution channel is defined by a reflective surface applied to a light transmissive material and has a plurality of light emitting apertures formed through the reflective surface; and scattering the light as it travels along the interior light passage to thereby promote light distribution along the channel so that light exits at discrete locations through substantially the entire length of the channel.

23. A method according to claim 22, wherein the light transmissive material is one of a transparent and a translucent material.

24. A method according to claim 22, wherein the light transmissive material is polymer.

25. A method according to claim 22, further comprising the steps of capturing the channeled light;

directing the captured light such that at least a portion follows along predetermined perimeter regions of an underlying external contour of the portable communication device; and controlling the perimeter light distribution to occur as a default operation activated by either a user or automatically by the device upon detection of a low light external condition during standby operation.

26. A method according to claim 25, wherein the channeled light follows a path along the device to emit light at, in serial order, an end portion, a corner portion, and a side portion.

27. A method according to claim 20, wherein said emitting step comprises emitting light in a manner which gives the appearance of a predetermined visual pattern.

28. A method according to claim 21, wherein the interior light channel comprises inwardly extending reflective protrusions facilitating the scattering of light as the light travels along the light channel.

29. A method according to claim 20, wherein the portable communications device is a wireless telephone and wherein said emitting step comprises emitting a plurality of discrete points of light about spaced portions of the perimeter of at least one major surface of the portable communications device.

30. A portable telephone comprising multiple exterior surfaces, wherein, during standby or non-active operational use, said portable telephone is configured such that light is generated at one location and emitted about a plurality of discrete light emitting apertures having a size of about 3 mm$^2$ or less that span spaced apart perimeter portions of the telephone including from at least two of said multiple surfaces thereby allowing increased visibility of the location of the device during low light conditions.

31. A portable telephone according to claim 30, wherein the light is captured in a light distribution channel having a reflective inner surface and an optically transmissive center portion, the light distribution channel having openings formed through the light reflective coating to define the external light emitting apertures, and wherein, in operation, the light is distributed through the channel and emitted from the light emitting regions located at a plurality of discrete positions spread along at least two of said multiple surfaces.

32. A portable telephone according to claim 31, wherein said at least two surfaces extend substantially perpendicularly with respect to each other.

33. An illumination case sized and configured to receive at least a portion of a portable communications device therein, said illumination case including at least one light distribution channel which engages with the device to capture, at an external surface location, the light produced by an integrated circuit held internally in the communications device and directs light from the internally mounted integrated circuit light source to a plurality of externally viewable spaced apart light emission points arranged to emit light at discrete spaced apart positions about perimeter portions of said device.

34. A portable communication device, with distributed perimeter low-light condition externally visible locating lights, comprising:

a portable communication device having a first major surface with a keypad and a display thereon and an opposing second major surface, said first and second major surfaces spaced apart by first and second sidewalls and first and second endwalls, wherein said portable communication device has an operative active mode and a standby mode;

a plurality of spaced apart light emitters positioned along selected perimeter portions of said portable communication device, such that said light emitters are spaced away from said display and keypad;

at least one light source operably associated with said plurality of light emitters;

at least one light distribution channel extending along at least a portion of the length and/or width of said device, wherein said light distribution channel is defined by spaced apart reflective surfaces, and wherein, in operation, openings formed in said reflective surface along said light distribution channel define said light emitters such that, in operation, said openings are configured to allow a portion of the light traveling in said light distribution channel to exit therefrom; and a power source operably associated with said light source, wherein said light emitters are configured to emit externally viewable light when said portable communication device at least when the device is in the standby mode.

35. A device according to claim 34, wherein the light distribution channel is disposed in an exterior peripheral case configured to encase at least a portion of the device therein.

36. A device according to claim 34, wherein the light distribution channel is formed integral to the device.

37. A device according to claim 34, wherein the light source comprises an integrated circuit light source held inside the device.

38. A device according to claim 37, wherein the light source comprises an LED.

39. A device according to claim 34, wherein said device has a user selection mode that allows a user to activate the perimeter lighting feature to cause said light emitters to emit externally viewable light when said portable communication device.

40. A device according to claim 34, further comprising an external low-light condition sensor in communication with said light source, wherein the perimeter lighting feature is activated automatically responsive to detection of a low light condition.

41. A device according to claim 34, further comprising first and second integrated circuit light sources in communication with said power source and said light distribution channel light emitters, the first light source generating toss light than the second light source.

42. A device according to claim 34, wherein the light emitters are sized with an area of about 3 mm$^2$ or less.

* * * * *

UNITED STATES PATENT AND TRADEMARK OFFICE
CERTIFICATE OF CORRECTION

PATENT NO.      : 6,435,690 B1
DATED           : August 20, 2002
INVENTOR(S)     : Till It is certified that error appears in the above-identified patent and that said Letters Patent is hereby corrected as shown below:

<u>Column 14,</u>
Line 21, "toss" should read -- less --

Signed and Sealed this

Eleventh Day of February, 2003

JAMES E. ROGAN
*Director of the United States Patent and Trademark Office*